United States Patent
Kodavati et al.

(10) Patent No.: US 11,886,458 B2
(45) Date of Patent: Jan. 30, 2024

(54) CONFIGURABLE DATA TRANSFORMATION BETWEEN DIFFERENT DATABASE SYSTEMS

(71) Applicant: salesforce.com, inc., San Francisco, CA (US)

(72) Inventors: Chakrapani Kodavati, Telangana (IN); Smitha Venkat Boyapati, Telangana (IN); Navratna Ojha, Telangana (IN)

(73) Assignee: Salesforce, Inc.

( * ) Notice: Subject to any disclaimer, the term of this patent is extended or adjusted under 35 U.S.C. 154(b) by 165 days.

(21) Appl. No.: 17/453,755

(22) Filed: Nov. 5, 2021

(65) Prior Publication Data
US 2023/0144349 A1    May 11, 2023

(51) Int. Cl.
*G06F 16/00* (2019.01)
*G06F 16/25* (2019.01)
*G06F 16/21* (2019.01)
*G06F 16/242* (2019.01)

(52) U.S. Cl.
CPC .......... *G06F 16/254* (2019.01); *G06F 16/212* (2019.01); *G06F 16/242* (2019.01); *G06F 16/258* (2019.01)

(58) Field of Classification Search
CPC .... G06F 16/212; G06F 16/254; G06F 16/258; G06F 16/25; G06F 16/242; G06F 16/21
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Cheryl Lewis
(74) *Attorney, Agent, or Firm* — Lorenz & Kopf, LLP

(57) ABSTRACT

Database systems and methods are provided for data migration between source and target computing systems using a configurable transformation service. The configurable transformation service obtains transformation configuration metadata associated with the particular combination of source and target computing systems, obtains a subset of source data in accordance with the transformation configuration metadata and transforms the subset of source data from a format associated with the source computing system to an intermediate, platform-independent format. The service transforms the subset of source data from the intermediate format to a destination format associated with the target computing system in accordance with the transformation configuration metadata and maintains the transformed subset of source data in the destination format in association with the target computing system.

20 Claims, 6 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Arsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,099,823 B2 * | 8/2021 | Gass .................. G06F 8/427 |
| 11,238,016 B1 * | 2/2022 | Srinivasan ........... G06F 16/212 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2022/0100774 A1 * | 3/2022 | Shah .................. G06F 16/282 |
| 2022/0188282 A1 * | 6/2022 | Kruempelmann .. G06F 16/2379 |

* cited by examiner

CONFIGURABLE DATA TRANSFORMATION BETWEEN DIFFERENT DATABASE SYSTEMS

TECHNICAL FIELD

One or more implementations relate to the field of database systems, and more specifically, to configurable data migration processes for replicating data across different database systems.

BACKGROUND

Modern software development has evolved towards web applications or cloud-based applications that provide access to data and services via the Internet or other networks. Often, it is desirable to retrieve or incorporate data or information from various different websites, platforms, database systems, or the like into a single web application or website in order to enhance or otherwise improve the user experience. As a result, various data migration products and techniques have been developed to leverage data warehousing and facilitate data integration across different systems or platforms for improved business intelligence, insights and decision-making. However, in practice, due to amount of data involved, the business logic to be applied, and the particular data migration architecture or configuration, there can be an undesirable amount of latency between when new or updated data becomes available at a source system and when that data is available for integration at a target system. Accordingly, it is desirable to facilitate data integration across different platforms or systems with reduced latency and other overhead costs.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
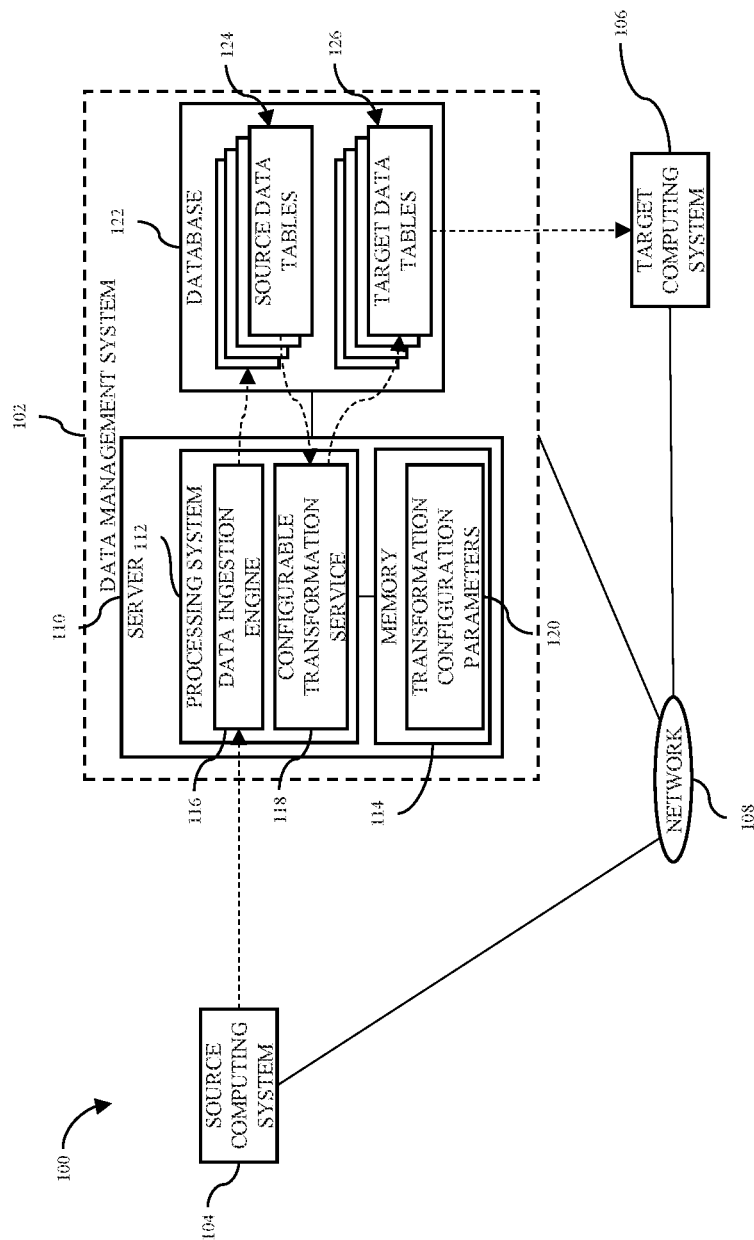
FIG. 1 is a block diagram illustrating a computing system including a configurable transformation service according to some example implementations.

The subject matter described herein generally relates to data migration between different computing systems using a configurable transformation extract, load and transformation (ELT) tool with core functionality that is extensible or otherwise capable of accommodating a variety of different combinations of source and destination computing systems without being limited to a particular ELT architecture or configuration. For a particular combination of source computing system and destination computing system (or target computing system), a configurable transformation service utilizes user-configurable transformation configuration parameters or other metadata to identify what subset of data is to be retrieved from the source computing system and the corresponding timing or manner of retrieving that subset of source data. The configurable transformation service retrieves or otherwise obtains the identified subset of source data in its initial data format associated with the source computing system in accordance with the transformation configuration metadata (e.g., a user-configured schedule). In this regard, the transformation configuration metadata may identify particular fields or columns of source data to be retrieved, the particular data tables or locations associated with the source computing system from which the source data is to be retrieved, and time ranges or other selection criteria that may be utilized to limit the data records or entries to be retrieved (e.g., by filtering or otherwise excluding older data).

After retrieving the desired subset of source data indicated by the transformation configuration metadata, the configurable transformation service transforms or otherwise converts the subset of source data from its initial structure according to the source data format into an intermediate data format that is independent of the source computing system, resulting in a corresponding staging subset of source data (or staging data) in a platform-independent, intermediate data format. In this regard, the transformation configuration metadata may include information regarding the fields or other characteristics of the source data format that is utilized by the configurable transformation service to transform the subset of source data from the source data format into staging data with the intermediate data format. The configurable transformation service then utilizes transformation configuration metadata associated with the target computing system to transform or otherwise convert the staging data from the intermediate data format into the destination data format associated with the target computing system, resulting in a transformed subset of the source data that is structured in accordance with the destination data format associated with the target computing system. The configurable transformation service stores or otherwise maintains the transformed subset of the source data in a manner that facilitates migration or integration into the target computing system, for example, by the target computing system referencing a location where the transformed subset of the source data is maintained or ingesting otherwise retrieving the transformed subset of the source data for storage and/or integration at the target computing system.

By leveraging configurable transformation configuration metadata, the functionality of the configurable transformation service can be extended to support data migration between any number of different combinations of different source computing systems and different target computing systems. Additionally, depending on the implementation, the transformation configuration metadata can be configured to reduce the amount of time and/or computing resources required to transform data between source and destination data formats, and thereby support data migration between computing systems with an increased frequency or rate such that changes to source data may be migrated to the target computing system and available at the target computing system in real-time or near real-time.

FIG. 1 depicts an exemplary system 100 for migrating data from a source computing system 104 to a target computing system 106 over a network 108. The system 100 includes a data management system 102 that is coupled to the network 108 and configurable to retrieve or otherwise obtain data from the source computing system 104 and support transformation and migration of the source data to the target computing system 106. In some implementations, the data management system 102 is realized as a data warehousing system (or data warehouse). It should be appreciated that FIG. 1 depicts a simplified representation of the system 100 for purposes of explanation and is not intended to be limiting.

The data management system 102 includes one or more servers 110 communicatively coupled to any number of different source computing systems 104 over a communications network 108, such as the Internet or any sort or combination of wired and/or wireless computer network, a cellular network, a mobile broadband network, a radio network, or the like. The server 110 generally represents a server computing device, server computing system or another combination of processing logic, circuitry, hardware, and/or other components configured to support a configurable transformation service 118 and related configurable data migration processes, tasks, operations, and/or functions described herein. In this regard, the server 110 generally includes a processing system 112, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system 112 may include or otherwise access a data storage element 114 (or memory) capable of storing programming instructions for execution by the processing system, that, when read and executed, are configurable cause processing system to create, generate, or otherwise facilitate the configurable transformation service 118 based at least in part upon code and other data, such as configurable transformation configuration parameters 120, that is stored or otherwise maintained by the memory 114 and support the configurable migration processes described herein. Depending on the implementation, the memory 114 may be realized as a random access memory (RAM), read only memory (ROM), flash memory, magnetic or optical mass storage, or any other suitable non-transitory short or long term data storage or other computer-readable media, and/or any suitable combination thereof.

The source computing system 104 generally represents any sort of database management system, resource management system or any other computing device, system or platform that maintains data, information, or other resources. For example, in some implementations, the source computing system 104 includes one or more servers communicatively coupled to the network 108 to support access to data, information, or other resources maintained at the source computing system 104 (e.g., in a database at the source computing system 104). For example, the source computing system 104 may maintain, on behalf of a user (or resource owner), data records entered or created by the user, files, objects or other records uploaded by the user, and/or files, objects or other records generated by one or more computing processes (e.g., based on user input or other records or files stored at the source computing system 104). In some implementations, the source computing system 104 is physically and logically distinct from the data management system 102 and the server 110, for example, the source computing system 104 may reside at a different physical location than the data management system 102 and be owned, controlled, or otherwise operated by a third party different from the one or more different parties that own, control and/or operate the data management system 102 and/or the target computing system 106.

In one or more implementations, the source computing system 104 is realized as an on-demand multi-tenant database system that is capable of dynamically creating and supporting virtual applications based upon data from a common resource database that is shared between multiple tenants, which may alternatively be referred to herein as a multi-tenant database. In such implementations, data and services generated by the virtual applications may be provided via the network 108 to any number of client devices, as desired. Each virtual application may be suitably generated at run-time (or on-demand) using a common application platform that securely provides access to the data in the database at the source computing system 104 for each of the various tenants subscribing to the multi-tenant system. In accordance with one non-limiting example, the source computing system 104 is implemented in the form of an on-demand multi-tenant customer relationship management (CRM) system that can support any number of authenticated users of multiple tenants. In this regard, one or more implementations of the source computing system 104 support one or more application program interfaces (APIs) that allow the data management system 102 and/or the server 110 to access data maintained at the source computing system 104 that would otherwise be secured and inaccessible to unauthorized third parties.

The target computing system 106 generally represents any sort of database management system, resource management system or any other computing device, system or platform that maintains data, information, or other resources where it is desirable to migrate data from the source computing system 104 to the target computing system 106 or otherwise integrate data from the source computing system 104 into the target computing system 106. In some implementations, the target computing system 106 is realized as a data visualization system or analytics system that is capable of dynamically creating and supporting web pages or other virtual applications based upon data from one or more data tables 126 associated with the target computing system 106 that are made available at the data management system 102. For example, one or more implementations of the data management system 102 support one or more application program interfaces (APIs) that allow the target computing system 106 to access data maintained in a target data table 126 at the data management system 102. That said, it should be appreciated the target computing system 106 is not limited to any particular implementation, and in other implementations, the target computing system 106 could be realized as any sort of database system, including on-demand and/or multi-tenant database systems.

Still referring to FIG. 1, in exemplary implementations, the processing system 112 at the server 110 executes or otherwise supports a data ingestion engine 116 or similar feature that retrieves or otherwise obtains data from the source computing system 104 and stores or otherwise maintains the retrieved source data in one or more tables 124 associated with the source computing system 104 in a database 122 or other suitable data storage element or repository associated with the data management system 102. As described in greater detail below, the configurable transformation service 118 utilizes the transformation configuration parameters 120 associated with the combination of the source computing system 104 and the target computing system 106 to identify or otherwise determine what subset of source data associated with the source computing system 104 is to be transformed for migration to or integration with the target computing system 106. The configurable transformation service 118 retrieves the identified subset of source data from the appropriate source data tables 124 and utilizes the transformation configuration parameters 120 to transform the obtained subset of source data from the format associated with the source computing system 104 into an intermediate format that is independent of the source computing system 104 and the target computing system 106. The configurable transformation service 118 utilizes the transformation configuration parameters 120 to transform the subset of source data from the intermediate format into a destination format associated with the target computing system 106 and the stores or otherwise maintains the transformed subset of source data in the destination format in the appropriate data table(s) 126 associated with the target computing system 106. Thereafter, the target computing system 106 may reference or otherwise access the target data table(s) 126 to retrieve or otherwise obtain the transformed subset of source data that is formatted in accordance with the schema or structure for the target computing system 106, thereby allowing the target computing system 106 to ingest or otherwise integrate the desired subset of source data without requiring any transformation or reformatting at the target computing system 106.

In exemplary implementations, the transformation configuration parameters 120 are created or otherwise defined by a user, such as an administrative user associated with the source computing system 104 or the target computing system 106. For example, in some implementations, the user may utilize a client device (e.g., any sort of personal computer, mobile telephone, tablet or other network-enabled electronic device) that executes or otherwise supports a client application that is capable of communicating with the configurable transformation service 118 over the network 108 using a networking protocol. For example, the user may utilize a web browser or similar local client application executed by the client device to navigate to a web page or other network address associated with the configurable transformation service 118 using the hypertext transport protocol (HTTP). In this regard, the configurable transformation service 118 may be configurable to initiate or otherwise provide an instance of a web application that includes transformation configuration web page GUI display within the client application that includes GUI elements for receiving transformation configuration metadata 120 from a user of the client device. That said, in other implementations, a user may utilize a command line interface or a script executing at the client device to input or otherwise provide a configuration file including the transformation configuration metadata 120 that is transmitted to the server 110 and/or the configurable transformation service 118 for storage in the memory 114. In this regard, it should be appreciated that there a numerous different ways in which the transformation configuration metadata 120 could be defined or created by an administrator or other user, and the subject matter described herein is not limited to any particular implementation.

It should be appreciated that although FIG. 1 depicts the configurable transformation service 118 and the transformation configuration parameters 120 being implemented at the data management system 102, in practice, the configurable transformation service 118 and/or the transformation configuration parameters 120 may be separate or distinct from the data management system 102. For example, the configurable transformation service 118 may be implemented at another server or computing device on the network 108 that is capable of accessing the data tables 124, 126 in the database 122 over the network 108, either directly or indirectly via the server 110 or an API associated with the data management system 102. Similarly, the transformation configuration parameters 120 may be stored or maintained at a remote location on the network 108 (e.g., an external data storage element, computing device, and/or the like) and retrieved by the configurable transformation service 118 from the remote location over the network 108.

Figure 2:
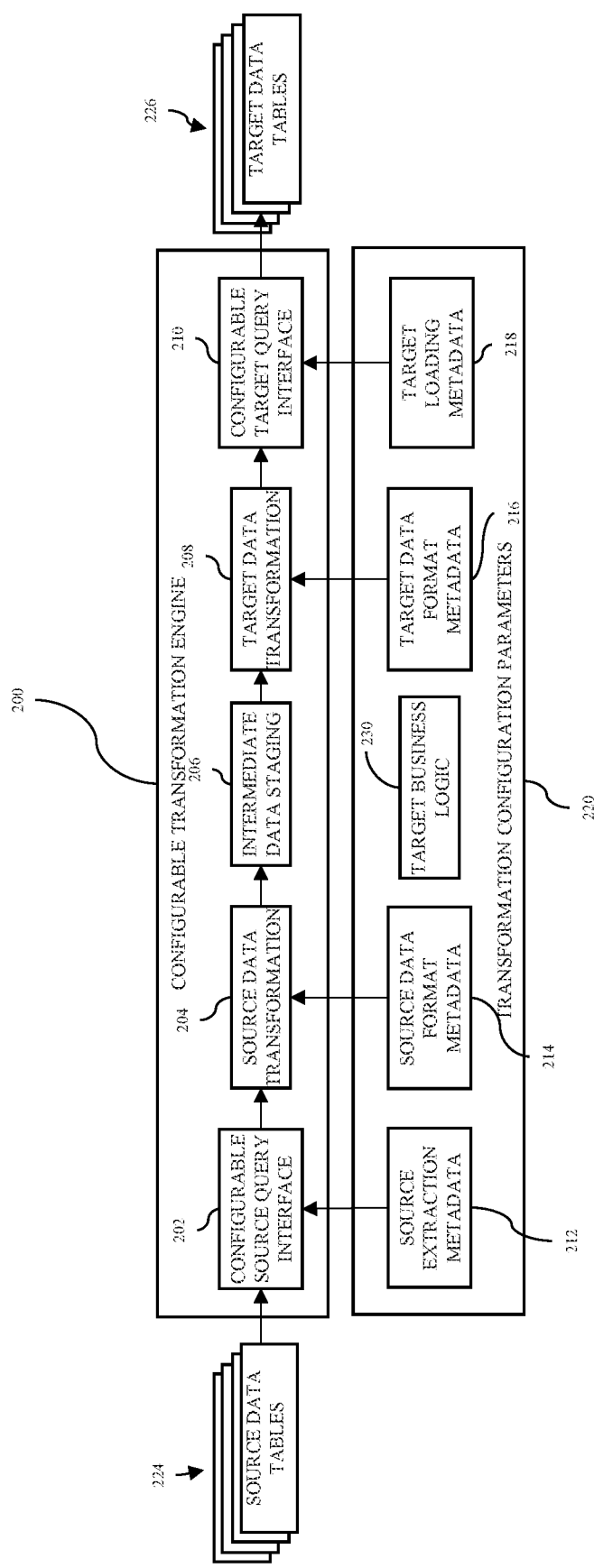
FIG. 2 is a block diagram illustrating a configurable transformation engine suitable for use with the computing system according to some example implementations.

FIG. 2 depicts an exemplary implementation of a configurable transformation engine 200 suitable for implementing the configurable transformation service 118 in the system 100 of FIG. 1 to transform source data from one or more source data tables 224 (e.g., source data tables 124) to one or more target data tables 226 (e.g., target data tables 126) for migration to a target computing system (e.g., target computing system 106) in accordance with configurable transformation configuration parameters 220 (e.g., transformation configuration parameters 120). In some implementations, the source data tables 224 reside in a database at a data warehousing system (e.g., source data tables 124 in the database 122 associated with the data management system 102), while in other implementations, the source data tables 224 reside at the source computing system 104. Similarly, in some implementations, the target data tables 226 reside in a database at a data warehousing system (e.g., target data tables 126 in the database 122 associated with the data management system 102), while in other implementations, the target data tables 226 reside at the target computing system 106.

The configurable transformation engine 200 includes a configurable source querying interface 202 that retrieves, extracts or otherwise obtains a subset of source data from the source data tables 224 in accordance with source extraction metadata 212. In this regard, the transformation configuration parameters 220 include source extraction metadata 212 that includes parameters identifying the particular source data table(s) 224 from which source data should be extracted, the particular of fields of data to be extracted from the source data table(s) 224, and the particular data records, objects or entries within the identified source data table(s) 224 from which the desired field(s) of data are to be extracted. Thus, the configurable source querying interface 202 may be configured to extract or obtain limited subset of the source data from the source data tables 224, rather than extracting the entire fields and/or records maintained in the particular source data table(s) 224, thereby reducing the amount of time required to extract the desired subset of source data for transformation. Additionally, in some implementations, the source extraction metadata 212 includes scheduling information or other temporal metadata that may be utilized by the configurable source querying interface 202 to automatically extract source data at desired intervals (or with a desired frequency), or to configure the configurable source querying interface 202 to extract the source data on an ad-hoc basis (e.g., in response to a user input or other triggering event or criterion). The temporal metadata may also be utilized to limit the amount of data records or entries from which data is to be extracted (e.g., only records or entries created, edited or updated within a preceding period time).

The configurable source querying interface 202 utilizes the source extraction metadata 212 to automatically generate or otherwise construct one or more query statements for retrieving the desired subset of source data from the desired source data table(s) 224. For example, in one implementation, the configurable source querying interface 202 utilizes the source extraction metadata 212 to automatically construct a Structured Query Language (SQL) SELECT statement that identifies the columns or fields of data to be retrieved identified by the source extraction metadata 212, from the source data table(s) 224 identified by the source extraction metadata 212, that also satisfy whatever other additional temporal or conditional criteria are specified by the source extraction metadata 212. Accordingly, for purposes of explanation and without limitation, the configurable source querying interface 202 may alternatively be referred to herein as the configurable source SQL interface 202. The configurable source SQL interface 202 transmits or otherwise provides the autogenerated query statement(s) to the database including the source data tables 224, which, in turn response to the query statement(s) by providing the requested subset of source data to the configurable source SQL interface 202.

The configurable transformation engine 200 includes a source data transformation module 204 that receives the extracted subset of source data obtained via the configurable source SQL interface 202 and transforms the extracted subset of source data from the format or structure associated with the source data tables 224 and the source computing system into an intermediate data format or structure that is independent of the source computing system or any other particular computing system or platform. In this regard, the source data transformation module 204 utilizes source data format metadata 214 that identifies or otherwise characterizes the structure or schema associated with the source computing system and/or source data tables 224 to convert, map or otherwise transform the extracted subset of source data from the source data format into the intermediate format. For example, in one implementation, the configurable transformation engine 200 is configured to support currency conversion, where the source data format metadata 214 includes information for identifying the country, denomination or currency type to be associated with values retrieved from a price field of entries in a source data table 224 for tracking orders of a particular product or service. In this regard, the source data transformation module 204 may utilize the currency type information from the source data format metadata 214 to convert numerical values into a different value in a reference currency (e.g., from rupees to dollars).

The source data transformation module 204 outputs or otherwise provides the extracted subset of the source data in the intermediate format to an intermediate data staging module 206 that is configured to temporarily store or otherwise maintain the extracted subset of the source data in the intermediate format, which may alternatively be referred to herein as the staging subset of source data or staging data. For example, continuing the currency conversion example, the intermediate data staging module 206 may maintain the transformed extracted values from the price field of entries in the source data table 224 in a different reference currency.

Still referring to FIG. 2, the configurable transformation engine 200 includes a target data transformation module 208 that receives the extracted subset of source data from the intermediate data staging module 206 and transforms the extracted subset of source data from the intermediate format into the desired destination data format, structure or schema associated with the target computing system. In this regard, the target data transformation module 208 utilizes target data format metadata 216 that identifies or otherwise characterizes the structure or schema associated with the target computing system and/or target data tables 226 to convert, map or otherwise transform the extracted subset of source data from the intermediate data format into the intermediate format. For example, continuing the exemplary currency conversion implementation, the target data format metadata 216 may include information for identifying the country, denomination or currency type to be associated with values in a particular field of entries in a target data table 226. In this regard, the target data transformation module 208 may utilize the currency type information from the target data format metadata 216 to convert numerical values from the reference currency maintained at the intermediate data staging module 206 into a different value in the appropriate currency for the destination field in the destination target data table 226 (e.g., from dollars to euros).

Similar to the configurable source querying interface 202, the configurable transformation service also includes a configurable target querying interface 210 that utilizes target loading metadata 218 to automatically generate or otherwise construct one or more query statements for loading the transformed subset of source data in the target data format into the desired target data table(s) 226. For example, in one implementation, the configurable target querying interface 210 utilizes the target loading metadata 218 to automatically construct a SQL LOAD statement that creates rows in the target data table(s) 226 identified by the target loading metadata 218. Accordingly, for purposes of explanation and without limitation, the configurable target querying interface 210 may alternatively be referred to herein as the configurable target SQL interface 210. By virtue of the extracted subset of source data having been transformed into the target data format, the columns or fields of the created rows in the target data table(s) 226 are populated with the appropriate values corresponding to the desired subset of data records in the source data table(s) 224 that satisfy any other additional configurable criteria for migration to the target computing system. The configurable target SQL interface 210 transmits or otherwise provides the autogenerated query statement(s) and corresponding transformed data to the database including the target data tables 226, which, in turn responds to the LOAD statement(s) by creating corresponding entries in the desired target data table(s) 226 that contain or otherwise include the transformed data provided with the LOAD statement(s).

In some implementations, the configurable transformation engine 200 is configured to support configurable target business logic 230 associated with the particular combination of source computing system and target computing system. In this regard, the configurable target business logic 230 may define data aggregations, summarizations or other statistical analyses or analytics to be performed on the desired subset of source data before transforming and loading the source data into the target computing system. For example, continuing the exemplary currency conversion implementation, the configurable target business logic 230 may specify the transformed extracted values for the price field from different orders be aggregated or summarized to calculate a revenue value that is then converted into the appropriate currency for the destination revenue field in the destination target data table 226, or that the aggregated revenue value be divided by the aggregation or sum of the extracted number of units sold to calculate an average price per unit that is then converted into the appropriate currency for the destination revenue field in the destination target data table 226. In exemplary implementations, the configurable target business logic 230 includes metadata defining daily exchange rates between different currencies or includes a uniform resource locator or other network address where the daily exchange rates can be retrieved or otherwise obtained substantially in real-time to support currency conversions by the target data transformation module 208 using the configurable target business logic 230 and the target data format metadata 216.

In one or more implementations, the configurable transformation engine 200 utilizes the target business logic 230 to calculate or otherwise determine one or more metrics associated with the extracted subset of source data in the intermediate data format at the intermediate data staging module 206 prior to transforming the calculated metric(s) from the intermediate, platform-independent format into the appropriate data format, structure or schema associated with the target computing system at the target data transformation module 208. In such implementations, the target data format metadata 216 defines how the calculated metric(s) should be structured, formatted or otherwise arranged before being loaded into the appropriate target data table(s) 226 identified by the target loading metadata 218.

Figure 3:
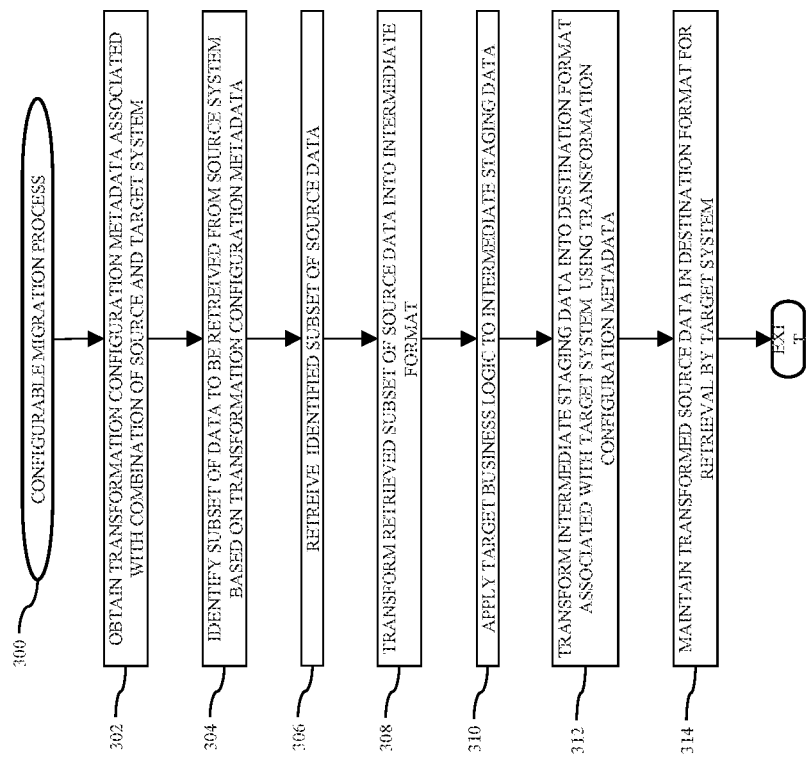
FIG. 3 is a flow diagram illustrating a configurable migration process suitable for implementation by a configurable transformation service according to some example implementations.

FIG. 3 depicts an exemplary configurable migration process 300 that may be implemented or otherwise performed by a computing system to migrate data from a source computing system to a target computing system perform additional tasks, functions, and/or operations described herein. For illustrative purposes, the following description may refer to elements mentioned above in connection with FIGS. 1-2. In this regard, while portions of the configurable migration process 300 may be performed by different elements of the computing system 100, for purposes of explanation, the subject matter is described herein in the context of the configurable migration process 300 being primarily performed by the configurable transformation service 118, 200. It should be appreciated that the configurable migration process 300 may include any number of additional or alternative tasks, the tasks need not be performed in the illustrated order and/or the tasks may be performed concurrently, and/or the configurable migration process 300 may be incorporated into a more comprehensive procedure or process having additional functionality not described in detail herein. Moreover, one or more of the tasks shown and described in the context of FIG. 3 could be omitted from a practical implementation of the configurable migration process 300 as long as the intended overall functionality remains intact.

Referring to FIG. 3, with continued reference to FIGS. 1-2, the illustrated configurable migration process 300 initializes or otherwise begins by identifying or otherwise obtaining transformation configuration metadata associated with a desired combination of source computing system and target computing system for data migration from the source computing system to the target computing system (task 302). In this regard, the transformation configuration parameters are defined, created or otherwise configured by a user to facilitate the configurable migration process 300 migrating data in a configurable manner that is specific to the particular combination of source computing system and target computing system, thereby allowing the core software code for implementing the underlying extraction, loading, and transformation functionality associated with the configurable migration process 300 (e.g., the code executable to support or provide the modules 202, 204, 206, 208, 210 depicted in FIG. 2) to be reused for any potential combination of different computing systems for data migration. As described above, depending on the implementation, the desired transformation configuration parameters 120, 220 may be input or otherwise defined by a user via a web page or virtual application associated with the configurable transformation service 118, 200, or a configuration file including the desired transformation configuration parameters 120, 220 may be uploaded, transferred or otherwise stored to a location in the memory 114 that is referenced by the configurable transformation service 118, 200 during execution.

The configurable migration process 300 automatically identifies the desired subset of data to be retrieved or extracted from the source computing system based on the transformation configuration metadata and automatically retrieves, extracts or otherwise obtains the desired subset of data from the source computing system (tasks 304, 306). For example, as described above, in exemplary implementations, the transformation configuration parameters 120, 220 includes source data extraction metadata 212 that identifies which source data table(s) 124, 224 data is to be extracted from, which fields or columns of data within those identified source data table(s) 124, 224 are to be extracted, and which data records or entries within those identified source data table(s) 124, 224 that those fields or columns of data are to be extracted from. Based on the source data extraction metadata 212, the configurable source query interface 202 of the configurable transformation service 118, 200 constructs one or more query statements that are executed or otherwise implemented at the database 122 maintaining the source data table(s) 124, 224 to obtain the desired subset of source data.

The configurable migration process 300 automatically transforms or otherwise converts the extracted subset of source data into from the raw source data format into an intermediate format that is independent of the source computing system (task 308). For example, as described above, in exemplary implementations, the transformation configuration parameters 120, 220 includes source data format metadata 214 that characterizes the fields, structure or schema associated with the source computing system 104 and/or the identified source data table(s) 124, 224 from which the data was extracted, and the configurable transformation service 118, 200 includes a source data transformation module 204 that converts, maps or otherwise transforms the extracted subset of source data into an intermediate data format that is independent of the structure or schema associated with the source computing system 104 and/or the identified source data table(s) 124, 224 using the source data format metadata 214. In this regard, the configurable source query interface 202 and the source data transformation module 204 are cooperatively configured to perform a user-configurable and source-specific extract, load and transform (ELT) procedure to migrate a desired subset of source data to an intermediate data staging module 206 in accordance with the source data extraction metadata 212 and the source data format metadata 214.

In one or more exemplary implementations, the configurable migration process 300 automatically applies business logic to the intermediate staged version of the extracted subset of source data to calculate or otherwise determine one or more metrics associated with the extracted subset of source data (task 310). For example, as described above, the transformation configuration parameters 120, 220 may include configurable target business logic 230 that defines data aggregations, summarizations or other statistical analyses or analytics to be performed on the desired subset of source data before transforming and loading the source data into the target computing system 106. The configurable transformation service 118, 200 calculates or otherwise determines the desired data aggregations, summarizations, statistics or other analytics on the extracted subset of source data in the intermediate data format at the intermediate staging module 206 in accordance with the target business logic 230 and updates the intermediate staging data to include the calculated data aggregations, summarizations, statistics or other analytics. For example, in some implementations, the intermediate staging data is updated or otherwise modified to include one or more additional rows and/or columns for maintaining the calculated data aggregations, summarizations, statistics or other analytics associated with the extracted subset of source data.

Still referring to FIG. 3 with reference to FIGS. 1-2, the configurable migration process 300 automatically transforms or otherwise converts the extracted subset of source data from the intermediate, platform-independent data format into a destination data format or structure that is associated with the target computing system using the transformation configuration metadata and then stores or otherwise maintains the transformed data in that destination data format for subsequent retrieval or ingestion by the target computing system (tasks 312, 314). For example, as described above, in exemplary implementations, the transformation configuration parameters 120, 220 includes target data format metadata 216 that characterizes the fields, structure or schema associated with the target computing system 106 and/or the target data table(s) 126, 226 where the extracted data is to be stored after transformation, and the configurable transformation service 118, 200 includes a target data transformation module 208 that converts, maps or otherwise transforms the extracted subset of source data from the intermediate data format into a different structure or schema associated with the target computing system 106 and/or the target data table(s) 126, 226 using the target data format metadata 216. Thereafter, the configurable target query interface 210 of the configurable transformation service 118, 200 constructs one or more query statements that are executed or otherwise implemented at the database 122 maintaining the target data table(s) 126, 226 to load the transformed extracted subset of source data into the target data table(s) 126, 226 in the target data format.

After the configurable migration process 300 is performed, the target computing system 106 may then reference or otherwise access the target data table(s) 126, 226 to retrieve the transformed extracted subset of source data, perform operations on the transformed extracted subset of source data or otherwise integrate the transformed extracted subset of source data into the target computing system 106. By virtue of the transformed extracted subset of source data residing in the target data table(s) 126, 226 in the target data format consistent with the structure or schema associated with the target computing system 106, the target computing system 106 can incorporate the extracted source data without any reformatting or conversions at the target computing system 106, thereby reducing the amount of time or processing resources at the target computing system 106 required for integrating or migrating the source data to the target computing system 106. Additionally, the amount of time or processing resources at the target computing system 106 required for integrating or migrating the source data may be further reduced by virtue of the source data extraction metadata 212 limiting the amount of extracted source data to only the subset that satisfies the desired criteria for migration, which also limits the amount of time or processing resources required by the configurable transformation service 118, 200 to transform and migrate the extracted source data to the target data format. Likewise, by applying business logic 230 associated with the target computing system 106 at the configurable transformation service 118, 200 reduces the amount of time or processing resources at the target computing system 106 that would otherwise be required to apply the business logic at the target computing system 106 to the transformed extracted subset of source data after being loaded into the target computing system 106. Furthermore, the configurable transformation service 118, 200 may be implemented at a cloud data warehouse, data lake or other system that employs a massively parallel processing (MPP) architecture that allows the configurable migration process 300 to be performed with reduced latency.

As described above, depending on the implementation, the configurable migration process 300 may be implemented or otherwise performed on a periodic or scheduled basis in accordance with one or more scheduling parameters of the transformation configuration parameters 120, 220. For example, configurable transformation service 118, 200 may be configured to check for new or updated source data at the source computing system 104 and/or the source data table(s) 124, 224 every thirty minutes, every hour, and/or the like. In such implementations, the new or updated values for the desired fields or columns of any new or updated entries at the source computing system 104 and/or the source data table(s) 124, 224 that satisfy the selection criteria for migration defined by the source data extraction metadata 212 are then extracted and transformed into the target data format and loaded into the target data table(s) 126, 226 (along with new or updated data aggregations, summarizations, statistics or other analytics calculated based on those new or updated values) at the desired frequency or periodic interval. In yet other implementations, the transformation configuration parameters 120, 220 may define one or more triggering criterion for performing the configurable migration process 300 on an ad-hoc basis responsive to the triggering criterion. In this regard, performance of the configurable migration process 300 for a particular combination of source and target computing systems 104, 106 may be conditioned on a user input manually initiating the configurable migration process 300 or occurrence of some other event or condition that satisfies the triggering criterion for initiating the configurable migration process 300. Furthermore, in some implementations, the configurable migration process 300 may be configured to be implemented on an ad-hoc basis in connection with a request or input from a user that includes the transformation configuration parameters 120, 220 to be utilized for that instance of the configurable migration process 300.

In one or more implementations, the configurable transformation service 118, 200 generates and maintains a log in the memory 114 that records metadata characterizing instances of the configurable migration process 300 to support auditing of past data migrations. For example, an entry in the audit log may include information identifying the user that initiated an ad-hoc instance of the configurable migration process 300 or another condition that triggered an ad-hoc instance of the configurable migration process 300 in association with information identifying the source computing system 104 and/or source data table(s) 124 associated with the respective instance of the configurable migration process 300, information identifying the target computing system 106 and/or target data table(s) 126 associated with the respective instance of the configurable migration process 300, and the like.

Figure 4:
FIG. 4 is a illustrates an implementation of the configurable migration process suitable of FIG. 3 for an example entry in a source data table.

FIG. 4 depicts an exemplary implementation of the configurable migration process 300 by the configurable transformation engine 200 depicting migration of values from a new or recently modified entry (SourceEntry 1) in a source data table 224 to a corresponding new or updated entry (TargetEntry 1) in a target data table 226. In this regard, FIG.

4 depicts a scenario where the source extraction metadata 212 identifies Field 1, Field 2 and Field 4 of the source data table 224 for extraction for migration to a particular target data table 226 (e.g., tasks 302, 304). As described above, the configurable source querying interface 202 generates or otherwise creates a query statement for retrieving values for only those identified fields of the source data table 224 (e.g., SELECT Field 1, Field 2, Field 4) (e.g., task 306). After extracting the corresponding values for those fields of the entry in the source data table 224 (e.g., Value 1, Value 2, Value 4), FIG. 4 depicts a scenario where the source data transformation module 204 utilizes the source data format metadata 214 to transform the extracted value for Field 4 (e.g., Value 4) into a different value (e.g., Value 5) that is maintained at the intermediate data staging module 206 (e.g., task 308). For example, in a currency conversion implementation, Value 5 may represent a conversion of the extracted value for Field 4 (Value 4) into a different currency.

Still referring to FIG. 4 with reference to FIGS. 2-3, in the illustrated implementation, the target business logic 230 is configured to cause the configurable transformation service 200 and/or the target data transformation module 208 to aggregate, sum or otherwise combine the extracted values from Field 1 and Field 2 of the source data table 224 to obtain an aggregated value (Value 7=Value 1+Value 2) (e.g., task 310). The configurable transformation service 200 and/or the target data transformation module 208 also utilizes the target data format metadata 216 to transform or otherwise convert the transformed extracted value for Field 4 (Value 5) into a different value (Value 6) in accordance with the format associated with the destination field (Target Field 1) in the target table 226 (e.g., task 312). In other words, Value 6 that is loaded into Target Field 1 of the TargetEntry 1 in the target data table 226 represents Value 4 from Field 4 of SourceEntry 1 transformed from the format or schema associated with the source data table 224 into the appropriate format or schema associated with the target data table 226. In some implementations, the aggregated value (Value 7) calculated based on other extracted fields may be similarly transformed or otherwise converted into the appropriate format for its destination field (Target Field 2) in the target table 226. Thereafter, the configurable target query interface 210 of the configurable transformation service 200 constructs one or more query statements that are configured to create a new entry (TargetEntry 1) in the destination target table 226 and load the transformed values in the appropriate target data format (Value 6 and Value 7) that were determined or otherwise derived from the extracted values (Value 1, Value 2 and Value 4) from the identified fields (Field 1, Field 2 and Field 4) of the source data table 224. By virtue of the configurable migration process 300 by the configurable transformation engine 200, the desired values from the source data table 224 can be transformed, reordered (or restructured), combined, and migrated to the appropriate fields of the target data table 226 in an efficient manner that allow for real-time or near real-time availability of data at the target computing system (e.g., by only extracting desired fields from the source data table, performing transformations and calculations prior to migration to the target computing system, etc.), in a manner that is extensible and user-configurable by virtue of the transformation configuration parameters 120, 220 (e.g., metadata 212, 214, 216, 218 and logic 230).

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
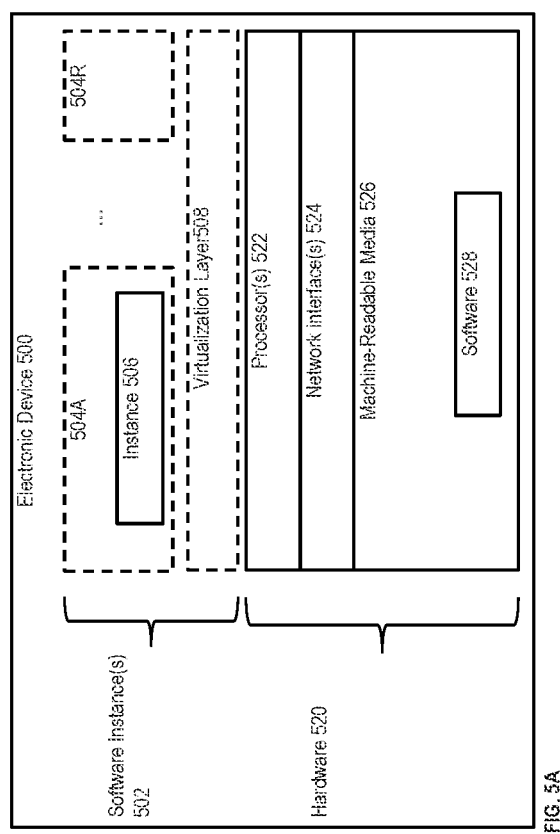
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and the configurable transformation service may be implemented in one or more electronic devices 500. In one implementation: 1) each of the clients is implemented in a separate one of the electronic devices 500 (e.g., in end user devices where the software 528 represents the software to implement clients to interface directly and/or indirectly with the configurable transformation service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the configurable transformation service is implemented in a separate set of one or more of the electronic devices 500 (e.g., a set of one or more server devices where the software 528 represents the software to implement the configurable transformation service); and 3) in operation, the electronic devices implementing the clients and the configurable transformation service would be communicatively coupled (e.g., by a network) and would establish between them (or through one or more other layers and/or or other services) connections for submitting requests and/or making API calls to the configurable transformation service. Other configurations of electronic devices may be used in other implementations (e.g., an implementation in which the client and the configurable transformation service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Figure 5B:
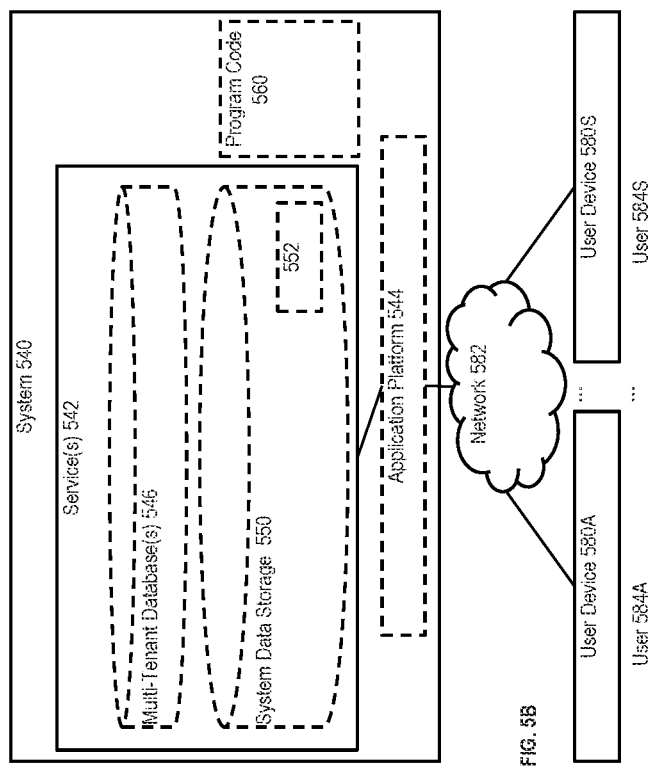
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the configurable transformation service (e.g., to support the configurable migration process 300). In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the configurable transformation service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A non-transitory machine-readable storage medium that provides instructions that, when executed by a processor, are configurable to cause said processor to perform operations comprising:
   obtaining transformation configuration metadata associated with a combination of a source computing system coupled to a network and a target computing system;
   obtaining a subset of data associated with the source computing system in accordance with the transformation configuration metadata;
   transforming the subset of data from a first format associated with the source computing system to an intermediate format;

transforming the subset of data from the intermediate format to a destination format associated with the target computing system in accordance with the transformation configuration metadata; and maintaining the subset of data in the destination format in association with the target computing system.

2. The non-transitory machine-readable storage medium of claim 1, wherein the instructions are configurable to cause said processor to obtain the subset of data by automatically generating a query statement for retrieving the subset of data from a source data table identified by the transformation configuration metadata.

3. The non-transitory machine-readable storage medium of claim 2, wherein:
the transformation configuration metadata comprises source data extraction metadata identifying the source data table and one or more fields of the source data table; and
the subset of data comprises values from the one or more fields of the source data table.

4. The non-transitory machine-readable storage medium of claim 1, wherein the intermediate format is independent of the source computing system and the target computing system.

5. The non-transitory machine-readable storage medium of claim 4, wherein:
the transformation configuration metadata comprises source data format metadata identifying a structure or schema associated with the source computing system; and
the instructions are configurable to cause said processor to transform the subset of data from the first format associated with the source computing system to the intermediate format using the source data format metadata to map the subset of data to the intermediate format.

6. The non-transitory machine-readable storage medium of claim 4, wherein:
the transformation configuration metadata comprises target data format metadata identifying a second structure or a second schema associated with the target computing system; and
the instructions are configurable to cause said processor to transform the subset of data from the intermediate format into the destination format consistent with the second structure or the second schema associated with the target computing system using the target data format metadata.

7. The non-transitory machine-readable storage medium of claim 1, wherein the instructions are configurable to cause said processor to maintain the subset of data in the destination format in association with the target computing system by automatically generating a query statement for loading the subset of data in the destination format into a target data table identified by the transformation configuration metadata.

8. The non-transitory machine-readable storage medium of claim 1, wherein:
the transformation configuration metadata comprises business logic associated with the target computing system; and
the instructions are configurable to cause said processor to calculate one or more metrics associated with the subset of data using the subset of data from the intermediate format in accordance with the business logic.

9. The non-transitory machine-readable storage medium of claim 8, wherein the instructions are configurable to cause said processor to transform the one or more metrics into the destination format associated with the target computing system in accordance with the transformation configuration metadata and load the one or more metrics into a target data table identified by the transformation configuration metadata.

10. A method of migrating data to a target computing system coupled to a network, the method comprising:
obtaining, by a configurable transformation service, transformation configuration metadata associated with a combination of a source computing system associated with the data and the target computing system;
obtaining, by the configurable transformation service, a subset of the data from a source data table identified by the transformation configuration metadata;
transforming, by the configurable transformation service, the subset of the data from a first format associated with the source data table to an intermediate format in accordance with the transformation configuration metadata;
transforming, by the configurable transformation service, the subset of the data from the intermediate format to a destination format associated with the target computing system in accordance with the transformation configuration metadata; and
maintaining the subset of the data in the destination format in a target data table associated with the target computing system.

11. The method of claim 10, wherein obtaining the subset of the data from the source data table comprises the configurable transformation service automatically generating a query statement for retrieving the subset of the data from the source data table identified by source data extraction metadata.

12. The method of claim 11, wherein:
the source data extraction metadata identifies one or more fields of the source data table to be extracted; and
automatically generating the query statement comprises automatically generating the query statement to obtain the subset of the data comprising values from the one or more fields of one or more entries in the source data table.

13. The method of claim 10, wherein:
the transformation configuration metadata comprises source data format metadata identifying a structure or schema associated with the source computing system; and
transforming the subset of the data from the first format associated with the source data table to the intermediate format comprises using the source data format metadata to convert the subset of the data from the structure or schema associated with the source computing system to the intermediate format.

14. The method of claim 13, wherein:
the transformation configuration metadata comprises target data format metadata identifying a second structure or a second schema associated with the target computing system; and
transforming the subset of the data from the intermediate format to the destination format comprises using the target data format metadata to convert the subset of the data from the intermediate format to the destination format consistent with the second structure or the second schema associated with the target computing system.

15. The method of claim 10, wherein maintaining the subset of the data in the destination format in the target data table associated with the target computing system comprises the configurable transformation service automatically generating a query statement for loading the subset of the data in the destination format into the target data table identified by the transformation configuration metadata.

16. The method of claim 10, further comprising calculating, by the configurable transformation service, one or more metrics associated with the subset of the data using the subset of the data in the intermediate format in accordance with business logic associated with the target computing system.

17. The method of claim 16, further comprising transforming, by the configurable transformation service, the one or more metrics into the destination format associated with the target computing system prior to loading the one or more metrics into the target data table identified by the transformation configuration metadata.

18. A data management system comprising:
    a non-transitory machine-readable storage medium that stores software; and
    a processor, coupled to the non-transitory machine-readable storage medium, to execute the software that implements a configurable transformation service and that is configurable to:
        obtain transformation configuration metadata associated with a combination of a source computing system coupled to a network and a target computing system;
        obtain a subset of data associated with the source computing system in accordance with the transformation configuration metadata;
        transform the subset of data from a first format associated with the source computing system to an intermediate format;
        transform the subset of data from the intermediate format to a destination format associated with the target computing system in accordance with the transformation configuration metadata; and
        maintain the subset of data in the destination format in association with the target computing system.

19. The data management system of claim 18, wherein:
    the first format comprises a first structure or first schema associated with the source computing system;
    the destination format comprises a second structure or second schema associated with the target computing system; and
    the intermediate format is independent of the source computing system or the target computing system.

20. The data management system of claim 18, wherein the transformation configuration metadata includes data extraction metadata identifying the subset of data to be obtained from a source data table associated with the source computing system, source data format metadata defining the first format, and target data format metadata defining the destination format.

* * * * *